United States Patent
Kompella (10) Patent No.: US 10,178,007 B2
(45) Date of Patent: *Jan. 8, 2019

(54) DETERMINING LIVENESS OF PROTOCOLS AND INTERFACES

(71) Applicant: Juniper Networks, Inc., Sunnyvale, CA (US)

(72) Inventor: Kireeti Kompella, Los Altos, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 340 days.

This patent is subject to a terminal disclaimer.

(21) Appl. No.: 14/885,154

(22) Filed: Oct. 16, 2015

(65) Prior Publication Data

US 2016/0043921 A1 Feb. 11, 2016

Related U.S. Application Data (63) Continuation of application No. 12/839,866, filed on Jul. 20, 2010, now Pat. No. 9,166,901, which is a
(Continued)

(51) Int. Cl.
*G06F 15/173* (2006.01)
*H04L 12/26* (2006.01)
(Continued)

(52) U.S. Cl.
CPC ...... *H04L 43/0817* (2013.01); *H04L 41/0654* (2013.01); *H04L 43/00* (2013.01);
(Continued)

(58) Field of Classification Search
CPC . H04L 12/2602; H04L 43/00; H04L 43/0811; H04L 43/10; H04L 45/026; H04L 43/06; H04L 45/02
(Continued)

(56) References Cited

U.S. PATENT DOCUMENTS 6,985,493 B1 1/2006 Roumas
7,120,688 B1 * 10/2006 Nguyen .................. H04L 43/10
709/224
(Continued)

OTHER PUBLICATIONS

Sandick et al; "Fast Liveness Protocol"; Feb. 2000; IETF; Network Working Group; RFC draft draft-sandick-flip-00.txt; pp. 1-18.*
(Continued)

*Primary Examiner* — Oleg Survillo
(74) *Attorney, Agent, or Firm* — John C. Pokotylo; Pokotylo Patent Services (57) ABSTRACT

The liveness of routing protocols can be determined using a mechanism to aggregate liveness information for the protocols. The ability of an interface to send and receive packets and the forwarding capability of an interface can also be determined using this mechanism. Since liveness information for multiple protocols, the liveness of interfaces, the forwarding capability of interfaces, or both, may be aggregated in a message, the message can be sent more often than could individual messages for each of the multiple protocols. This allows fast detection of failures, and sending connectivity messages for the individual protocols, such as neighbor "hellos," to be sent less often.

24 Claims, 7 Drawing Sheets

Related U.S. Application Data continuation of application No. 10/775,486, filed on Feb. 10, 2004, now Pat. No. 7,769,885.

(60) Provisional application No. 60/472,859, filed on May 23, 2003.

(51) Int. Cl.
| | |
|---|---|
| *H04L 12/701* | (2013.01) |
| *H04L 12/751* | (2013.01) |
| *H04L 12/781* | (2013.01) |
| *H04L 29/12* | (2006.01) |
| *H04L 12/24* | (2006.01) |
| *H04L 29/06* | (2006.01) |

(52) U.S. Cl.
CPC .......... *H04L 43/0811* (2013.01); *H04L 43/10* (2013.01); *H04L 45/00* (2013.01); *H04L 45/026* (2013.01); *H04L 45/52* (2013.01); *H04L 61/2007* (2013.01); *H04L 69/08* (2013.01); *H04L 43/06* (2013.01); *H04L 45/02* (2013.01)

(58) Field of Classification Search
USPC .................................. 709/223, 224, 238
See application file for complete search history.

(56) References Cited

U.S. PATENT DOCUMENTS

| | | | |
|---|---|---|---|
| 2002/0093961 A1* | 7/2002 | Sharma | ............... H04L 41/0806 370/392 |
| 2003/0120826 A1 | 6/2003 | Shay | |

OTHER PUBLICATIONS

K. Kompella; Protocol Liveness Protocol; Oct. 2002; Network Working Group; draft-kompella-rag-plp-00.txt; 16 pages (Year: 2002).*

* cited by examiner

| NEIGHBOR (PEER) INFORMATION | | | | | | |
|---|---|---|---|---|---|---|
| SESSION | NEIGHBOR NODE ID | INTERFACE INDEX | LAST RECEIVED SEQUENCE | LAST RECEIVED PROTOCOL REGISTRATION | LAST RECEIVED PROTOCOL STATUS | LOST HELLOS TIMER |
| ⋮ | ⋮ | ⋮ | ⋮ | ⋮ | ⋮ | ⋮ |
| 510 | 520 | 530 | 540 | 550 | 560 | 570 |

DETERMINING LIVENESS OF PROTOCOLS AND INTERFACES

§ 0. RELATED APPLICATIONS

This application is a continuation of U.S. patent application Ser. No. 12/839,866 (referred to as "the '866 application" and incorporated herein by reference), filed on Jul. 20, 2010, titled "DETERMINING LIVENESS OF PROTOCOLS AND INTERFACES" and listing Kireeti KOMPELLA, as the inventor, the '866 application being a continuation of U.S. patent application Ser. No. 10/775,486 (referred to as "the '486 application" and incorporated herein by reference), filed on Feb. 10, 2004, titled "DETERMINING LIVENESS OF PROTOCOLS AND INTERFACES" and listing Kireeti KOMPELLA, as the inventor, the '486 application being based upon and claiming the benefit of U.S. Provisional Application No. 60/472,859, entitled "DETERMINING LIVENESS OF MULTIPLE PROTOCOLS AND/OR INTERFACES," filed on May 23, 2003 and listing Kireeti KOMPELLA as the inventor. The utility and provisional applications are expressly incorporated herein by reference. The scope of the invention is not limited to any requirements of the specific embodiments in that application.

§ 1. BACKGROUND OF THE INVENTION

§ 1.1 Field of the Invention

The invention concerns detecting errors in connections, protocols, data plane components, or any combination of these.

§ 1.2 Background Information

The description of art in this section is not, and should not be interpreted to be, an admission that such art is prior art to the invention.

Figure 1:
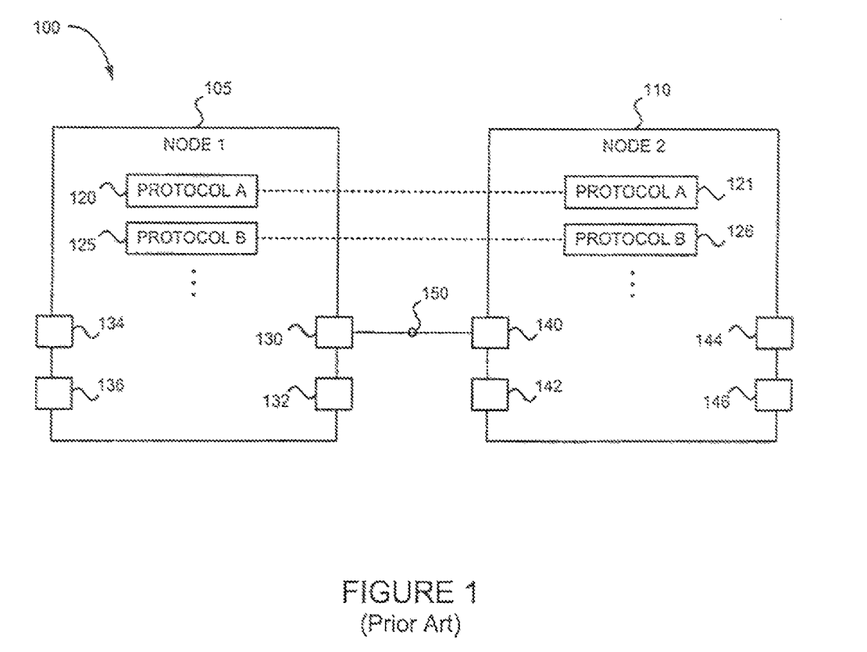
FIG. 1 illustrates nodes supporting peering protocols.

A protocol is a specific set of rules, procedures, or conventions relating to the format and timing of data transmission between two devices. Accordingly, a protocol is a standard set of procedures that two data devices use to work with each other. Nodes, such as routers, in communications networks may use protocols to exchange information. For example, routers may use routing protocols to exchange information used to determine routes. FIG. 1 illustrates two nodes 105,110 coupled via communications link 150. Node 105 includes various interfaces 130,132,134,136 and supports protocols 120,125. Interface 130 terminates communications link 150. Similarly, node 110 includes interfaces 140,142,144,146 and supports protocols 121,126. Interface 140 terminates communications link 150. Node 105 and node 110 can be considered "neighbors" or "adjacencies" since they each terminate communications link 150. As indicated by the dashed lines, an instance of protocol A 120 and an instance of protocol B 125 at node 105 may communicate with another instance of protocol A 121 and another instance of protocol B 126, respectively, at node 110. Although not shown, the communications between the protocols actually occur via interfaces 130,140 and communications link 150.

Conventional routing protocols may include some form of liveness detection. For example, the intermediate system-intermediate system protocol (IS-IS) and the open shortest path first protocol (OSPF) include a "hello" mechanism that lets a router running IS-IS or OSPF know whether nodes sharing a communications link with the router are still up. Some protocols, such as a border gateway protocol (BGP), use the underlying transport to determine the liveness of their neighbors. In the case of BGP, transmission control protocol (TCP) keepalives are used. Other protocols, such as routing information protocols (RIP), have intrinsic liveness mechanisms. In most cases, once an adjacency with a neighbor node running the same protocol is established with an initial hello message, subsequent hello messages don't need to carry a lot of information.

In most, if not all, of these liveness detection mechanisms, the time needed to conclude that one's neighbor is down ranges from seconds, to tens, or even hundreds of seconds. For example, with IS-IS, hellos are normally sent every nine (9) seconds. A node determines a neighbor to be down only after three (3) consecutive hellos have been unanswered. Accordingly, a node running IS-IS normally needs at least 27 seconds before it determines that a neighbor node is down. Similarly, with the point-to-point protocol (PPP) hellos are normally sent every ten (10) seconds. A node determines a neighbor to be down only after three (3) consecutive hellos have been unanswered. Accordingly, a node running PPP normally needs at least 30 seconds before it determines whether a neighbor node is down.

Since routers and other nodes on the Internet are predominantly used for communicating data for applications (such as e-mail) that are tolerant of some delay or packets received out of sequence, the conventional liveness detection schemes are acceptable. However, as more demanding applications (such as voice over IP) use the Internet or other packet-switched networks, there are instances where detecting that a neighbor is down in a few tenths of a second, or even hundredths of a second may be necessary. Such fast liveness detection is needed, for example, where failover needs to occur quickly so that an end user doesn't perceive, or at least isn't unduly annoyed by, the failure of an adjacency (e.g., due to any one of a node failure, a link failure, or a protocol failure).

One approach to determining liveness faster is to allow faster (e.g., sub-second) protocol hello timers. This is feasible for some protocols, but might require changes to the protocol. Implementing these protocol changes on new nodes, and propagating these protocol changes to nodes previously deployed in a communications network is not trivial. Moreover, for some other protocols faster protocol hello timers are simply not feasible.

Even if all protocols could implement fast protocol hello timers, at least two additional issues make such a simple, brute force change unattractive. First, routers often implement multiple routing protocols, each having its own liveness detection mechanism. Consequently, updating each routing protocol to enable fast detection can lead to a considerable amount of work. Second, hello messages often carry more than just liveness information, and can therefore be fairly large and require non-trivial computational effort to process. Consequently, running fast liveness detection between a pair of neighbor nodes, each running multiple protocols, can be expensive in terms of communications and computational resources required to communicate and process the frequent, lengthy messages for liveness detection.

Additionally, it is desirable to check interface forwarding liveness (i.e., the ability to forward data over an interface). Forwarding liveness may be a function of various components in the "data plane" of a data forwarding device such as a router. For example, data plane components may include a forwarding table (sometimes referred to as a forwarding information base), switch fabric, forwarding lookup engine, traffic scheduler, traffic classifier, buffers, segmenters, reassemblers, resequencers, etc. Such components may be embodied as memory, processors, ASICs, etc.

In view of the foregoing, there is a need to detect liveness faster that conventional liveness detection schemes. It is desirable that such liveness detection (i) have minimal impact on existing protocols, (ii) not waste communications resources, and (iii) not be computationally expensive.

§ 2. SUMMARY OF THE INVENTION

Apparatus, data structures, and methods consistent with the principles of the invention provide a routing protocol independent mechanism for fast liveness detection (more accurately, deadness detection). At least some embodiments consistent with the principles of the invention require no changes to the packets sent or received by any routing protocol. Embodiments consistent with the principles the invention need not supercede the existing hello functionality of protocols, such as routing and forwarding protocols (if any). This aspect may be important in instances where existing mechanisms carry much more information than just liveness.

In one embodiment consistent with the principles of the present invention, a sending node may (a) accept status information from at least two protocols, (b) compose a message including the status information, and (c) send the message towards a neighbor node. In at least one embodiment, the sending node may further (d) maintain a first timer for tracking a send time interval such that the acts of composing a message and sending the message are performed after expiration of the first timer, and (e) restart the first timer after the message is sent.

In one embodiment consistent with the principles of the present invention, a receiving node may (a) receive a message including status information for each of at least two protocols of a neighbor node and a time interval; and (b) update the neighbor node protocol status information using the message. In at least one embodiment, the receiving node may update neighbor node protocol status information by (a) setting a first timer to the time interval and starting the first timer, (b) if the first timer expires, setting the status of each of the protocols of the neighbor node to down, and (c) if a further message is received then, resetting the first timer to the new time interval and restarting the first timer.

§ 3. BRIEF DESCRIPTION OF THE DRAWINGS

FIG. 3, which includes FIGS. 3A and 3B, is a flow diagram of an exemplary method for determining protocol liveness in a manner consistent with the principles of the invention.

§ 4. DETAILED DESCRIPTION

Elements, apparatus, systems, computer-implemented code, data structures and methods consistent with the principles of the invention permit the liveness of protocols, interfaces, or both to be monitored. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the invention is not limited to the embodiments shown and the inventor regards his invention as the following disclosed methods, apparatus and data structures and any other patentable subject matter.

An exemplary environment in which the invention may operate is described in § 4.1. Then, elements, apparatus, systems, computer-implemented code, methods and data structures that may be used to perform operations and store information in manners consistent with the principles of the invention are described in § 4.2. An example illustrating operations performed by an exemplary embodiment of the invention is then provided in § 4.3. Finally, some conclusions regarding the invention are set forth in § 4.4.

§ 4.1 Environment in which the Invention May Operate

The invention may be used in communication systems including nodes for forwarding data, such as packets. Such nodes may be routers. For example, the invention may be used to quickly detect a down connection (e.g., a down link, node, or interface), protocol, or both. The invention may be used in conjunction with a fast reroute technique, a graceful (or hitless) restart technique, or some other failover technique.

The invention can be used in an exemplary communications environment, such as the one illustrated in FIG. 1. Referring to FIG. 1, suppose node 105 and node 110 are routers, and that protocol A is IS-IS and protocol B is resource reservation protocol (RSVP). Suppose further that node 105 and node 110 have established an IS-IS adjacency and one or more RSVP sessions. Consistent with the principles of the invention, both nodes 105,110 may be configured with a time interval (referred to as "the dead interval") in which to send a hello. If the IS-IS dead interval for node 105 is 27 seconds, then node 110 will declare its IS-IS adjacency with node 105 dead if it 110 doesn't receive an IS-IS hello from node 105 within 27 seconds of the previous hello. Typically, node 105 will send hellos more frequently than once every 27 seconds so that even if a hello or two are lost, the adjacency stays up.

Once node 105 and node 110 have established various routing protocol "sessions" between themselves, they can begin exchanging aggregated protocol and/or forwarding liveness (APFL) hellos in a manner consistent with the principles of the invention. In one embodiment of the invention, an APFL hello contains a list of protocols that it is reporting on (in this case, IS-IS and RSVP), as well as the status of those protocols (e.g., up or down). The APFL hello message may also contain a dead interval. Node 105 is essentially saying "If I don't send you an APFL hello within the dead interval of my previous APFL hello, declare all protocols reported in the last received APFL hello as dead."

Note that the regular IS-IS hellos should also be running. Thus, node 110 will declare its IS-IS adjacency with node 105 dead if any of the following occur:

a) no IS-IS hello is received within the IS-IS dead interval of the previous IS-IS hello;

b) an APFL hello is received, and states that it is reporting on IS-IS, and indicates that the status of IS-IS is down; or c) the last received APFL hello stated that it was reporting on IS-IS, but no APFL hello is received in the aggregated liveness dead interval following the last APFL hello.

Note that if an APFL hello was never received, condition (c) doesn't apply. Further, if IS-IS graceful restart is present, condition (c) should include the additional condition that it occur in the absence of IS-IS graceful restart.

Moreover, Node 105 may include means for monitoring forwarding liveness for each of one or more of its interfaces 130, 132, 134, 135. Similarly, Node 110 may include means for monitoring forwarding liveness for each of one or more of its interfaces 140, 142, 144 and 146. Forwarding liveness refers to the ability to forward traffic over an interface.

§ 4.2 Exemplary Methods, Elements, Apparatus, Systems and Data Structures

Exemplary methods, elements, apparatus, systems and data structures for performing APFL operations will now be described.

Figure 2:
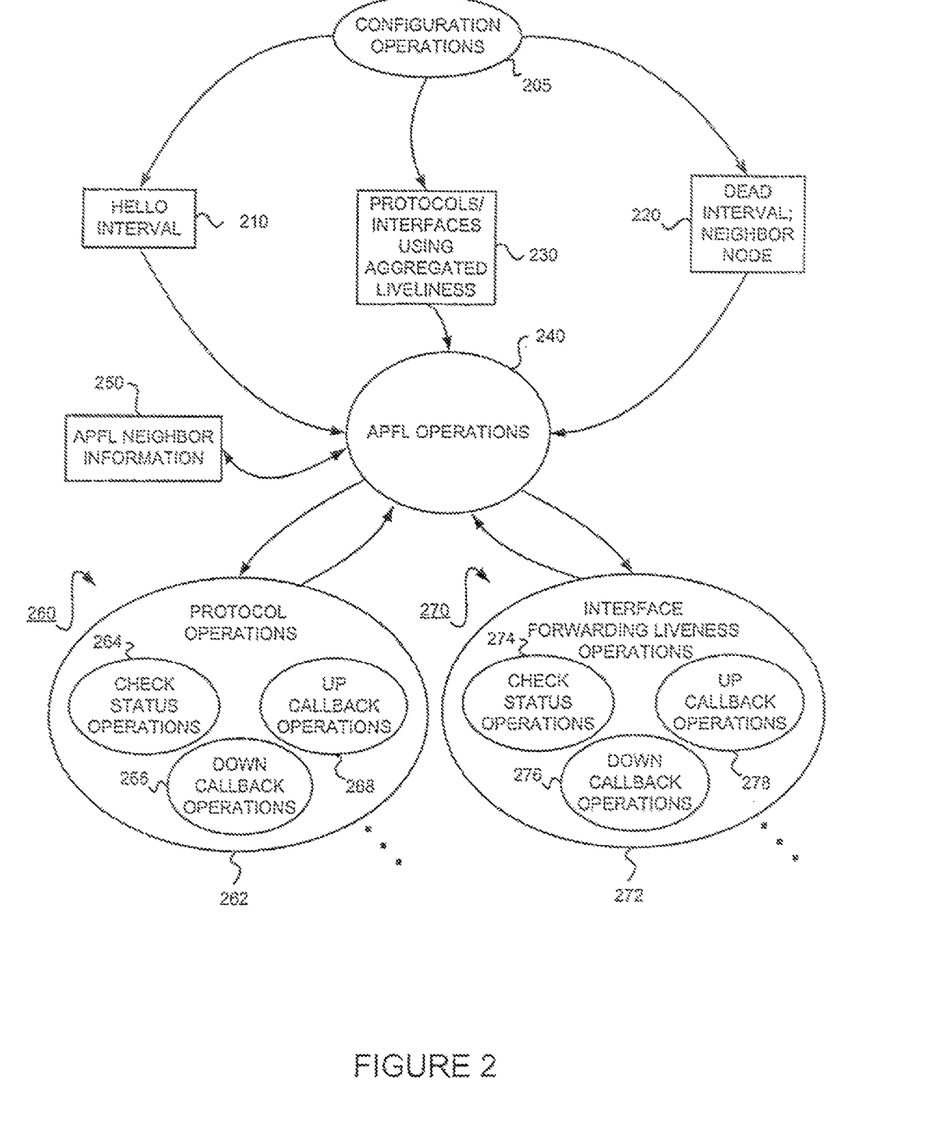
FIG. 2 illustrates operations and information that may be used to monitor protocols, interfaces, or both, in a manner consistent with the principles of the invention.

FIG. 2 illustrates operations and information that may be used to monitor protocols, interfaces, or both, in a manner consistent with the principles of the invention. APFL operations 240 may be a utility that may be used by one or more protocol operations 260, interface forwarding liveness operations 270, or both. Each of protocol operations 260, as exemplified by protocol operations 262, may include check status operations 264 for reporting status information to APFL operations 240, as well as down callback operations 266 and up callback operations 268 which respond to neighbor protocol status information provided by APFL operations 240. Similarly, each of interface forwarding liveness operations 270, as exemplified by interface forwarding liveness operations 272, may include check status operations 274 for reporting status information to APFL operations 240, as well as down callback operations 276 and up callback operations 278 which respond to neighbor interface status information provided by APFL operations 240.

APFL operations 240 use hello interval information 210, protocols, interfaces, or both using aggregated liveness 230, {dead interval, neighbor node} pair information 220, and APFL neighbor information 250 to determine liveness of various peer protocols, forwarding liveness of interfaces of various neighbor nodes, or both. Configuration operations 205 may be used to configure hello interval information 210, protocols, interfaces, or both using aggregated liveness 230, and {dead interval, neighbor node} pair information 220.

§ 4.2.1 Exemplary APFL Method

Figures 3, 3A:
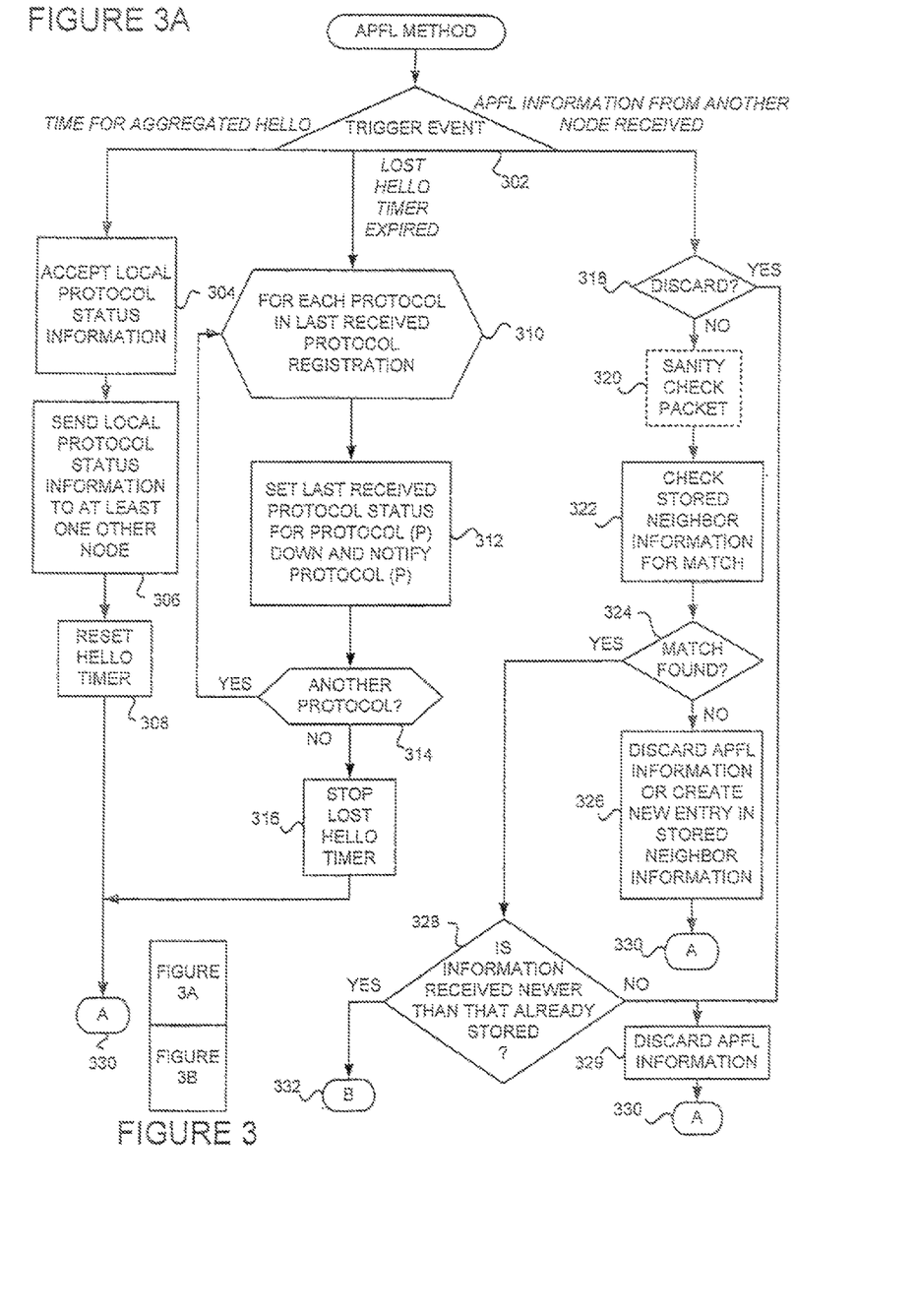
Figure 3B:
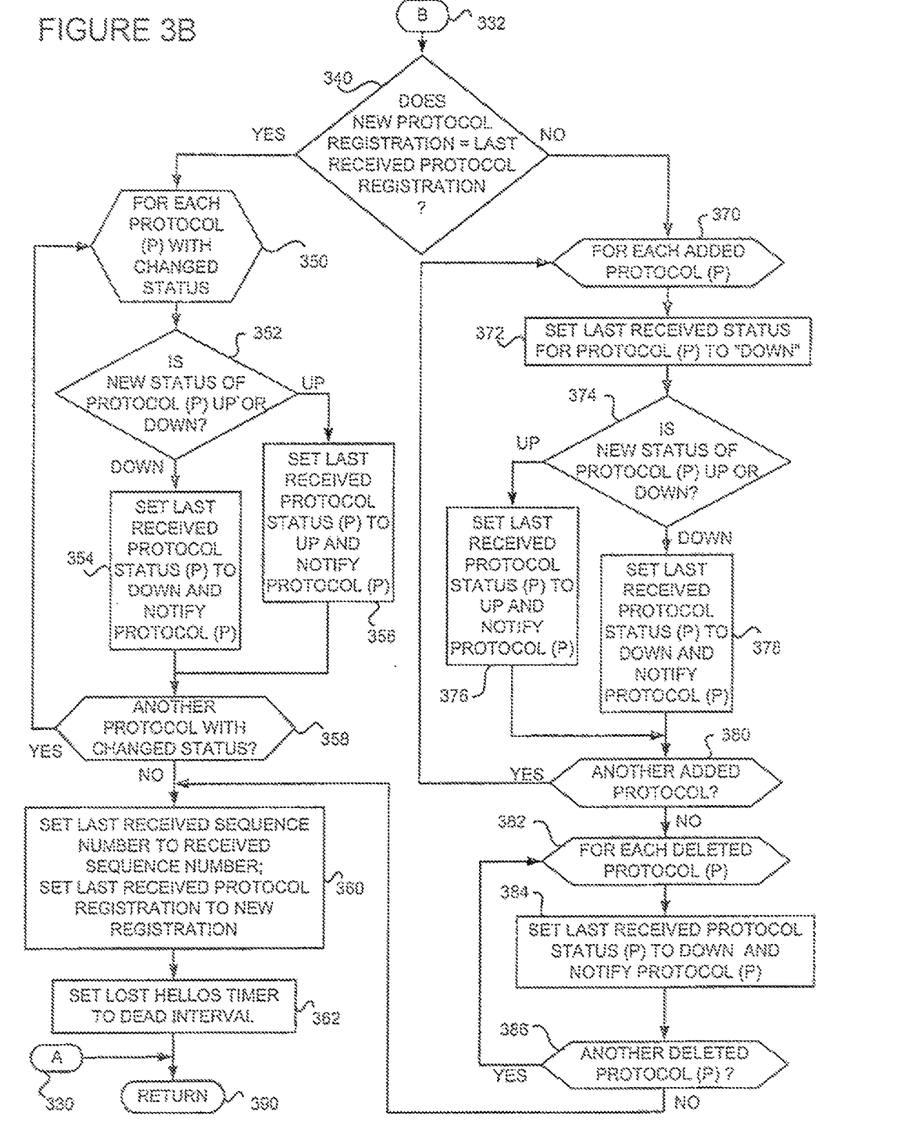

FIG. 3 shows the arrangement of FIGS. 3A and 3B, which show a flow diagram of an exemplary method for supporting APFL in a manner consistent with the principles of the invention. The branches of the method may be triggered in response to an event (302). For example, if it is time to send an APFL hello (e.g., if a hello timer expired), local protocol status information is accepted, if it has not already been accepted (304). The accepted local protocol status information is then sent to at least one other node (306). In one embodiment, the accepted local protocol status information is sent to any adjacent node that has a protocol peering with the node running the method. The hello timer is reset (308) and the method is left (330, 390).

Returning to block 302, if a lost hello timer has expired, the last received protocol status for each protocol in the last received protocol registration is set to "down" and the protocol is notified (Loop 310-314, including 312). The lost hello timer is then stopped (316) and the method is left (330, 390).

Again referring back to block 302, if APFL information, such as a packet, is received from another node, it is determined whether or not to discard the information. This determination may be based on configuration or rate-limiting (318). If it is decided to discard the APFL information, the APFL information is discarded (329) and the method is left (330 and 390). If, on the other hand, it is decided to not discard the APFL information, the contents of the APFL packet may be checked for sanity, such as self-consistency, as well as consistency with previously received APFL packets (320). If sanity check fails, the APFL information should be discarded (329). Stored neighbor information (described below with reference to FIG. 5) is checked for a match (322 and 324). If a match is not found, the APFL information is discarded or a new entry in the stored neighbor information is created (326) before the method is left (330 and 390). If a match is found, it is determined whether the received information is newer than the matching information already stored (328). If not, the information is stale and is therefore discarded (329) and the method is left (330 and 390). If, on the other hand, the received information is newer than the matching information already stored, it may be determined whether the new protocol registration is the same as a last received protocol registration (332 and 340). More specifically, if the received protocol registration is the same as the last received protocol registration, then the liveness information may have been aggregated from the same set of protocols. Otherwise, liveness information may be provided for a newly added protocol, or no longer provided from a removed protocol.

If the new protocol registration is the same as the last protocol registration, it is determined whether or not the status of any of the protocols has changed (Loop 350-358). For each protocol with a changed status, it is determined whether the status of the protocol is up or down (352). If the status of the protocol changed to "down," the last received protocol status for the protocol is set to down, and the local instance of the protocol is notified (358). If, on the other hand, the status of the protocol changed to "up", the last received protocol status for the protocol is set to up, and the local instance of the protocol is notified (356). After any protocols with changed status are processed, the last received sequence number is set to the sequence number in the received information (360). The lost hellos timer is set to the "dead interval" (362) and the method is left (390).

Referring back to block 340, if the new protocol registration is not the same as the last received protocol registration (i.e., if the status for each of one or more protocols has been added and/or removed), processing is performed for each newly added protocols, if any, and for each deleted protocol, if any. More specifically, for each added protocol (Loop 370-380), the last received status for the protocol is set to "down" (372) and it is determined whether the status of the new protocol is up or down (372). If the status of the new protocol is determined to be up, the last received protocol status for the protocol is set to "up" and the local instance of the protocol is notified (376). If, on the other hand, the status of the new protocol is determined to be down, the last received protocol status for the protocol is set to "down" and the local instance of the protocol is notified (378). For each deleted or removed protocol (Loop 382-386), the last received protocol status is set to "down" and the local instance of the protocol is notified (384). Once processing is performed for each newly added protocol, if any, and for each deleted protocol, if any, as described above, the last received sequence number is set to the sequence number in the received information (360). The lost hellos timer is set to the "dead interval" (362) and the method is left (390).

Although the foregoing description referred to aggregated protocol status, the aggregated protocol status may include forwarding liveness status. Such forwarding liveness status may be tracked per interface. Thus, the forwarding liveness of an interface may be treated as just another protocol. Consistent with the principles of the invention, some embodiments may simply track forwarding liveness status, yet have utility even without tracking any protocol status information.

§ 4.2.2 Exemplary APFL Information Messages

Figure 4:
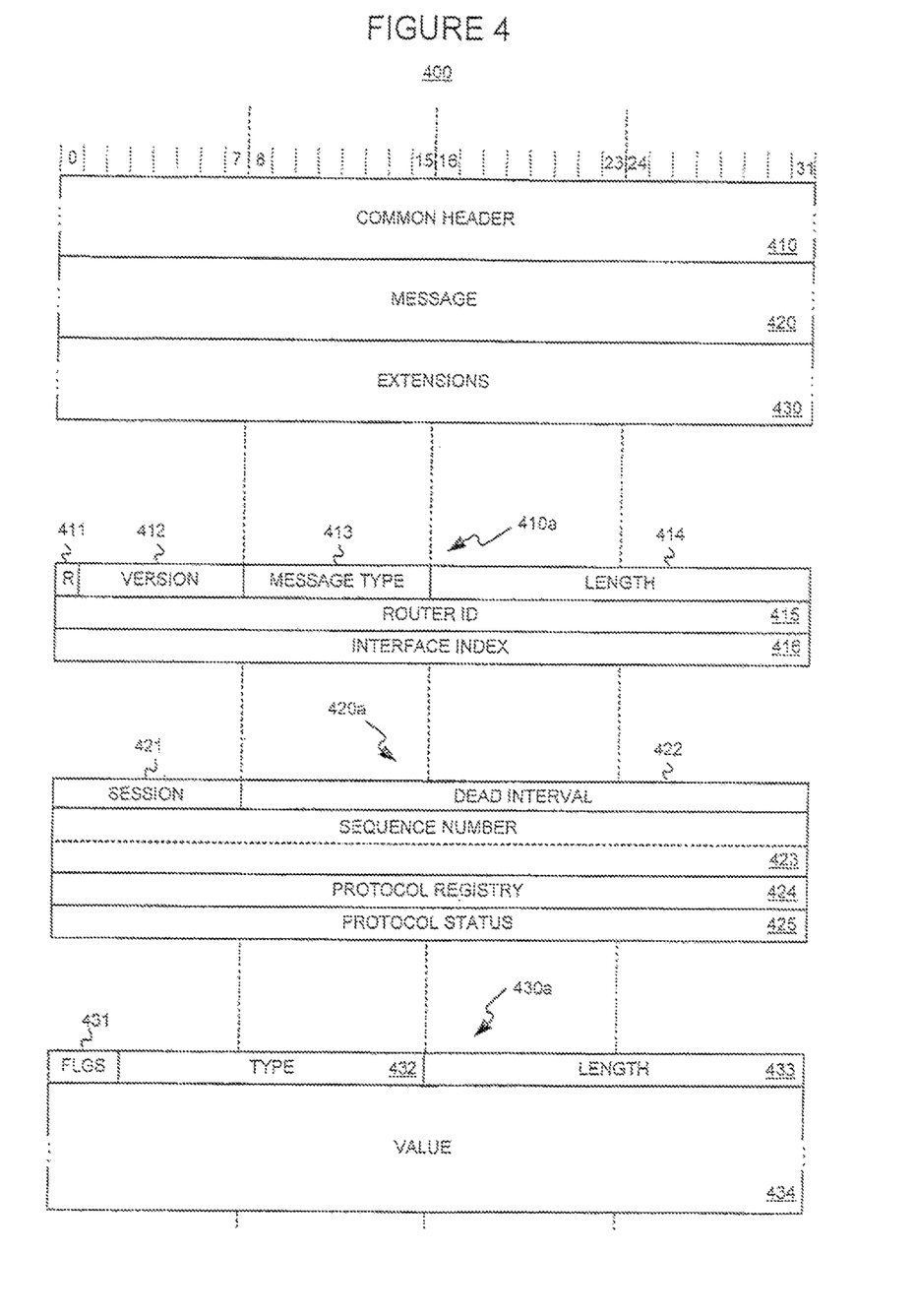
FIG. 4 illustrates an exemplary data structure which may be used to communicate protocol status information in a manner consistent with the principles of the invention.

APFL information processed as described above may be carried in a packet, such as an Internet protocol (IP) packet. FIG. 4 illustrates an exemplary data structure 400, referred to as an APFL message, which may be used to communicate protocol status information in a manner consistent with the principles of the invention. An APFL message may include one or more APFL packets. In one embodiment consistent with the principles of the invention, APFL packets are IP (version 4 or version 6) packets with a new protocol identifier. This new protocol identifier may be defined by a standard body, such as the Internet Assigned Numbers Authority (IANA). An alternative to defining a new IP protocol identifier for APFL is to use a user datagram protocol (UDP) header and a well-defined port for APFL. Either of these techniques let a node receiving the packet know that the packet is carrying APFL information. Alternative techniques for accomplishing this are possible. Apart from the header, the packet format may be identical for both IPv4 and IPv6. Packets are sent to one or more neighbors. When the neighbors are directly attached, the source IP address is the sender's address on that interface, if any. Otherwise, the source IP address is the sender's router ID. The destination IP address is an ALL-ALP-ROUTERS multicast address defined by standards body by such as IANA, or the ALL-ROUTERS multicast address. When the APFL neighbor is not directly attached, the IP source address is the sender's router ID, and the destination address is a routable address belonging to the neighbor. The IP time-to-live (TTL) value should be set to 255, or some other predetermined value, so that a receiving node can check that an APFL packet came from an adjacent node and not from a node multiple hops away.

In one exemplary embodiment, all APFL packets contain a single APFL message, and each APFL message may include a common header 410, a message 420, and extensions 430. The total length of the APFL message, i.e., the sum of the lengths of all sections, may be provided in common header 410. Each section may be zero-padded so that its length is a multiple of four octets. Common header 410 has a length of 12 octets. The length of message section 420 may be fixed for each message type. The length of extensions section 430 may be inferred as the length of the APFL message 400 minus the lengths of the other sections 410 and 420. It is expected that APFL messages will be small enough so as not to require fragmentation. However, fragmentation and re-assembly should be supported. Naturally, the APFL information may be carried in ways other than the described APFL message in an APFL packet.

An exemplary format 410a of common header 410 has the following structure. An R bit 411 indicates whether the APFL message is being sent to a directly attached node (R=0), or to a remote node (R=1). A Version field 412 (7 bits) indicates an APFL version number. A Message Type field 413 (8 bits) may include the following values:

| Type | Message |
|------|---------|
| 0 | Unused |
| 1 | Hello |
| 2-255 | Reserved for future use |

A Length field 414 (16 bits) indicates the combined lengths of common header 410, message 420 and extensions 430, if any, in octets. A Router ID field 415 (32 bits) is set to the sender's four octet router ID. APFL messages sent to directly attached neighbors (R=0) are associated with an interface. If the interface is numbered, i.e., configured with a unique IP address, an Interface Index field 416 (32 bits) may be set to zero, and the interface identified by the source IPv4 or IPv6 address in the IP header. Otherwise, Interface Index field 416 is set to the index allocated by the sending node for this interface, and the source IP address is an address identifying the sender. For APFL messages sent to a node not directly attached (R=1), Interface Index field 416 is set to zero, and the source IPv4 or IPv6 address is a routable address identifying the sending node.

An exemplary format 420a of the message section 420 has the following structure. A Session field 421 (8 bits) can be used to identify several independent APFL sessions between a pair of nodes. Dead Interval field (24 bits) 422 is specified in microseconds. A node sending a Hello with a Dead Interval of N tells its APFL neighbor node to consider all the protocols that the node is reporting on as dead if the neighbor node doesn't receive another Hello from the sending node in N microseconds. (Recall, e.g., 310, 312, and 314 of FIG. 3.) A Sequence Number field 423 (64 bits) is a monotonically increasing number, with the first 4-octet word being the higher order word and the second being the lower order word. One possible implementation of sequence numbers is to use a 32-bit time-of-day (in seconds) for the first word, and a monotonically increasing counter, that resets to zero when the time-of-day changes, for the second word. One use of Sequence Number field 423 is to foil replay attacks in the context of some means of signing APFL messages. Providing Sequence Number in the Hello message might be less desirable if an alternative security mechanism is provided. A Protocol Registry field 424 is a 32-bit vector that indicates the protocols for which liveness reports will be sent in Hello messages. (Recall, e.g., 340 of FIG. 3.) The semantics for the bit positions (bit 0 being the Most Significant Bit) of an exemplary Protocol Registry field 424 are as follows:

| Bit position | Protocol |
|--------------|----------|
| 0 | BGP |
| 1 | IS-IS |
| 2 | OSPF v2 |
| 3 | OSPF v3 |
| 4 | RIP v1/v2 |
| 5 | RIP NG |
| 6 | PIM |
| 7 | DVMRP |
| 8 | LDP |
| 9 | RSVP |
| 10 | LMP |
| 11 | Reserved (should be zero) |
| 30 | Forwarding liveness |
| 31 | Layer-2 (or interface liveness) |

Finally, a Protocol Status field 425 is a 32-bit vector that parallels Protocol Registry field 424. For example, if $i^{th}$ bit of Protocol Status field 425 is set (i.e., is 1), this indicates that the protocol represented by the $i^{th}$ bit of Protocol Registry field 424 is down. Note that bit i in Protocol Status field 425 vector should not be set if bit i in Protocol Registry field 424 is not set—any bit so set should be ignored by the receiving node.

Notice that the forwarding liveness of an interface, i.e., the ability of a node to forward packets received on that interface to other interfaces, or to forward packets received on other interfaces to that interface, may be indicated consistent with the principles of the invention. Forwarding liveness may include the ability to receive and process packets from an interface, the integrity and correct operation of forwarding (route lookup) tables, and the ability to rewrite and send packets on the interface.

Although message segment data structure 420a is compact and permits a short simple message, the use of separate a protocol registry field 424 and a separate protocol status field 425 conveys three states—(i) not reporting, (ii) reporting and up, and (iii) reporting and down—for each protocol using two bits. In an alternative embodiment, two bits are provided per protocol to indicate one of four, not only three, possible states. These four states are (i) not reporting, (ii) reporting and up, (iii) reporting and down, (iv) reporting and up, but in restart mode. This fourth state can be used with so-called "graceful restart" techniques, such as those described in U.S. patent application Ser. No. 10/095,000 entitled "GRACEFUL RESTART FOR USE IN NODES EMPLOYING LABEL SWITCHED PATH SIGNALING PROTOCOLS," filed on Mar. 11, 2002, and listing Kireeti Kompella, Manoj Leelanivas, Ping Pan, and Yakov Rekhter as inventors (incorporated herein by reference). More specifically, under some graceful restart techniques, a protocol may restart, but the node may continue forwarding data using existing forwarding information. If the restart of the protocol is not complete within a certain time however, the forwarding information may be considered too stale to be used. The fact that a node is restarting is known by a peer (e.g., an adjacent node), but is generally not distributed beyond peers so that the rest of the network is not aware that a node is restarting. This prevents a large number of nodes from updating network topology information, re-computing routes, and re-computing forwarding information when doing so may be unnecessary.

An exemplary format of extensions section 430 includes a list of type-length-value (TLV) triplets. Each TLV 430a may include a Flags field 431, a Type field 432, a Length field 433 and a Value field 434. Each message type 413 defines the set of types it supports in Type field 432. That is, the message is parsed first in order to interpret Type. Each type defines its own flags found in Flags field 431. That is, Type field 432 is parsed first in order to interpret Rags field 431. Length field 433 indicates the length of Value field 434 in octets. Value field 434 is padded with octets of zero so that the total length of TLV 430a is a multiple of four octets.

Extensions section 430 can have multiple TLV 430a fields. If parsing the TLVs occurs beyond the end of message 400 (as defined by Length field 414 in common header 410a), it is assumed that the APFL message has been corrupted and is to be discarded. (Recall, e.g., 318 of FIG. 3.)

Although the APFL packet and APFL message may be used to carry APFL information, alternatives are possible. Such alternatives may convey the status of multiple protocols in a compact form. In yet another alternative, the information may include interface forwarding liveness status information, without any protocol status information. In at least one embodiment, interface forwarding liveness status information may only convey whether the interface can forward data or not. In another embodiment, interface forwarding liveness status information may convey additional information such as (i) the integrity and correct operation of forwarding (route lookup) tables, (ii) the integrity and correct operation of switch fabric, (iii) the integrity and correct operation of a forwarding lookup engine, (iv) the integrity and correct operation of a traffic scheduler, (v) the integrity and correct operation of a traffic (flow) classifier, (vi) the integrity and correct operation of buffers in the data plane, (vii) the integrity and correct operation of packet segmentation modules, (viii) the integrity and correct operation of packet reassembly modules, (ix) the integrity and correct operation of packet re-sequencing modules, (x) whether or not a node is restarting, (xi) whether or not the forwarding plane is congested, (xii) the integrity and correct operation of fragmentation modules, (xiii) bit error rate at a link interface, (xiv) clock synchronization at a link interface, and/or (xv) various quantitative values reflecting some quality of forwarding, or qualitative information derived therefrom. Alternatively, or in addition, interface forwarding liveness status information may convey when a data plane component is operating in a particular manner, such as at a predetermined capacity (e.g., buffers >75% full, N packets outstanding the switch fabric, etc.) Additional bits may be used to convey quantitative forwarding plane status information. Alternatively, or in addition, forwarding liveness status information may convey whether or not a link terminated by the interface can forward data, or whether or not the link can forward data under certain conditions.

§ 4.2.3 Exemplary Neighbor APFL Information

Figure 5:
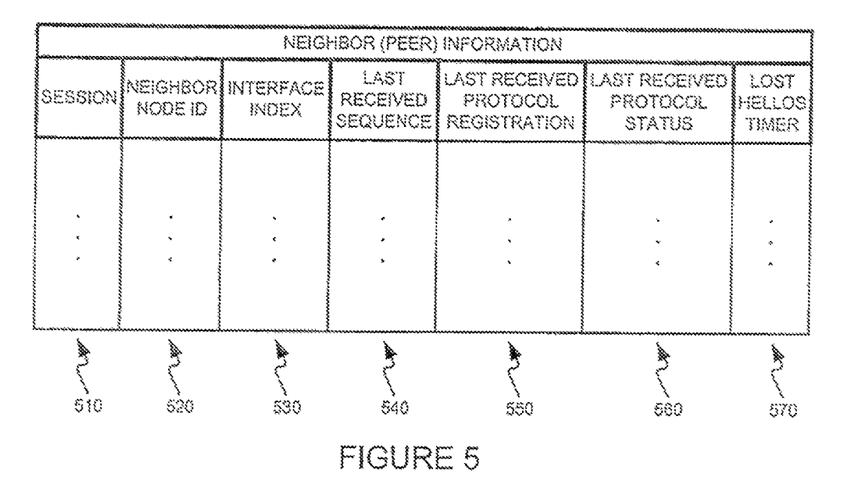
FIG. 5 illustrates an exemplary data structure which may be used to store neighbor or peer information in a manner consistent with the principles of the invention.

Recall from 322 of FIG. 3 that received APFL information is checked against stored neighbor APFL information. Further recall from 312, 326, 354, 356, 360, 376, 378 and 384 of FIG. 3 that such neighbor APFL information may be updated based on the expiration of a lost hello timer or based on newly received APFL information. FIG. 5 illustrates an exemplary data structure which may be used to store neighbor or peer information in a manner consistent with the principles of the invention. The neighbor or peer information may include a number of entries. Each entry may include a session field 510 (for storing session information 421), a neighbor node identifier field 520 (for storing router ID information 415), an interface index field 530 (for storing interface index information 416), a last received sequence field 540 (for storing sequence number information 423 from the last received APFL message), a last received protocol registration field 550 (for storing protocol registry information 424 from the last received APFL message), a last received protocol status field 560 (for storing protocol status information 425 from a last received APFL message) and a lost hellos timer field 570 for storing the dead interval in the last received (or newest) APFL message.

§ 4.2.4 Exemplary Apparatus

Figure 6:
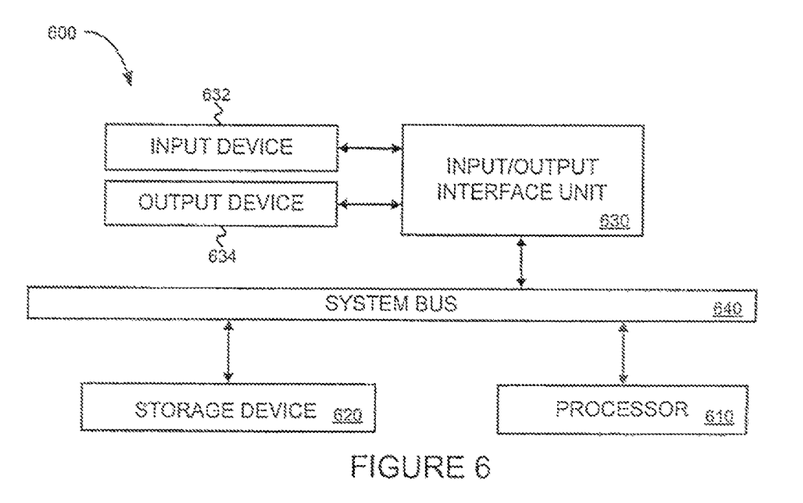
FIG. 6 is a block diagram of apparatus that may be used to perform operations and store information consistent with the principles of the invention.

FIG. 6 is block diagram of a machine 600 which may perform one or more of the operations and store at least some of the information discussed above. Machine 600 basically includes a processor 610, an input/output interface unit 630, a storage device 620, and a system bus, a network, or both 640 for facilitating the communication of information among the coupled elements. An input device 632 and an output device 634 may be coupled with input/output interface 630. Operations of the invention may be performed by processor 610 executing instructions. The instructions may be stored in storage device 620, received via input/output interface 630, or both. The instructions may be functionally grouped into processing modules. Although not shown, machine 600 may be comprised of more than one of some or all of these components.

Machine 600 may be a router for example. In an exemplary router, processor 610 may include a microprocessor, a network processor, (e.g., custom) integrated circuits, or any combination of these. In the exemplary router, storage device 620 may include one or more ROM, RAM, SDRAM, SRAM, SSRAM, DRAM, flash drive, hard disk drive, flash card, other types of memory, or any combination of these. Storage device 620 may include program instructions defining an operating system (OS), a protocol module (e.g. daemon), other modules, or any combination of these. In one embodiment, methods of the invention may be performed by processor 600 executing stored program instructions (e.g., defining a part of the protocol module or daemon). At least a portion of the machine executable instructions may be stored (temporarily or more permanently) on storage device 620, may be received from an external source via an input/output interface unit 630, or both. Finally, in the exemplary router, input/output interface unit 630, input device 632 and output device 634 may include interfaces to terminate communications links.

Operations consistent with the principles of the invention may be performed on systems other than routers. Such other systems may employ different hardware, different software, or both. Exemplary machine 600 may include other elements in addition to, or in place of, the elements listed in FIG. 6 without departing from the principles of the invention. For example, there could be one or more additional processors, input devices, storage devices, etc. The components may be included on a single unit, or may be distributed over more than one unit.

§ 4.2.5 Protocol Methods for Supporting APFL

Recall from FIG. 2 that each 262 of a number of protocol operations 260 may employ check status operations 264, down callback operations 266 and up callback operations 268 for purposes of "hooking" APFL operations 240 with the protocols 260. Basically, one or more of protocol operations 260 may provide its status to APFL operations 240 (Recall, e.g., 304 of FIG. 3), and receive information about the status of each of its peers from APFL operations 240 (Recall, e.g., 312, 354, 356, 376, 378, and 384 of FIG. 3).

In one embodiment of the invention, each of operations 264, 266, 268 take two arguments—the protocol P and the APFL neighbor Y. One exemplary status check operation 264—Status_Check(P, Y)—normally returns "up," regardless of the current state of protocol P's adjacency with Y. Status_Check(P,Y) only returns "down" when protocol P is not configured to run with neighbor Y; or if P is planning to go down shortly (graceful shutdown). If protocol P doesn't respond in a timely fashion to the Status_Check( ) query, APFL operations 240 may declare the status of protocol P as "down." In one exemplary down callback operations 266, a call Down(P, Y) should be treated by protocol P as if its regular hellos, if any, timed out. In one exemplary up callback operations 268, a call Up(P, Y) is generally ignored. The following sections provide protocol-specific details that may be implemented.

§ 4.2.5.1 BGP v4

BGP should treat a Down(BGP, Y) callback just as if the Hold Timer of the session with neighbor Y had expired (See Section 6.5 of Rekhter, Y., and T. Li (Editors), "A Border Gateway Protocol 4 (BGP-4)", RFC 1771, March 1995, incorporated herein by reference). Following a Down(BGP, Y) call, BGP may re-establish peers as usual. BGP should ignore Up(BGP, Y) callbacks.

§ 4.2.5.2 IS-IS, OSPF v2 and OSPF v3

IS-IS, OSPF v2 and OSPF v3 should treat a Down(P, Y) callback (where P is one of IS-IS, OSPFv2 or OSPFv3) just as they would loss of hellos from neighbor Y. Following a Down(P, Y) callback, IS-IS, OSPF v2 and OSPF v3 should re-establish adjacencies as usual. IS-IS, OSPF v2 and OSPF v3 should ignore Up( ) callbacks.

§ 4.2.5.3 RIP v1, RIP v2 and RIP ng

RIP should respond to a Down(P, Y) callback (where P is one of RIPv1, RIPv2 or RIP-ng) by immediately deleting all RIP routes received from Y, as if the "timeout" timer in Section 3.8 of Malkin, G., "RIP Version 2", STD 56, RFC 2453, November 1998 (or section 2.3 of Malkin, G., "RIPng for IPv6", RFC 2080, January 1997, both incorporated herein by reference, expired for all those routes. RIP should ignore Up( ) callbacks.

§ 4.2.5.4 RSVP

RSVP should respond to a Down(RSVP, Y) callback just as it would loss of hellos from neighbor Y, or some other indication that either Y or the interface to Y is no longer working. Following a Down(RSVP, Y) callback, RSVP should attempt to re-establish the state that it had held for neighbor Y by following its normal protocol operation. RSVP should ignore Up( ) callbacks.

§ 4.2.5.5 Forwarding Liveness

As described earlier, APFL can be used to communicate, to a neighbor, one's ability to forward packets from or to a given interface, and to learn about a neighbor's ability for the same. An interface receiving a Down(P, Y) callback (where P is 'forwarding liveness') should inform all modules (such as routing protocols) interested in the forwarding capability status of neighbor Y that Y is no longer capable of forwarding packets received over the communication link attached to that interface. An interface receiving an Up(P, Y) callback should inform the modules interested in the forwarding capability status of neighbor Y that Y can forward packets received over the communication link attached to that interface.

§ 4.2.6 Interface Methods for Supporting APFL

Without any protocols registered, APFL operations 240 can act as an interface liveness protocol for interfaces. Thus, the principles of the invention may be applied to test the liveness of interfaces that don't have layer 2 liveness mechanisms, such as Ethernet, and other interfaces whose layer 2 liveness mechanisms may be considered too slow for some purposes, such as the point-to-point protocol (PPP) for example. Recall from FIG. 2 that each 272 of a number of interface operations 270 may employ check status operations 274, down callback operations 276 and up callback operations 278 for purposes of "hooking" aggregated liveness determination operations 240 with the interfaces 270.

For PPP interfaces, a Down(Layer-2, Y) callback should be ignored unless the PPP is in state 9 ("opened") for the interface. If the Down callback is received while in state 9, the following actions should be taken: (i) declare "This-Layer-Down"; (ii) send a Configure Request, and (iii) transition to state 6 (in the notation of Section 4.1 of Simpson, W., (Editor), "The Point-to-Point Protocol (PPP)", STD 51, RFC 1661, July 1994, incorporated herein by reference. Up(Layer-2, Y) callbacks should be ignored on PPP interfaces.

Ethernet interfaces are a bit more complicated since they are multipoint interfaces. A Down(Layer-2, Y) callback should tell all modules interested in the layer-2 status of the interface (such as routing protocols, SNMP agents, etc.) that neighbor Y is no longer reachable, and appropriate action should be taken. For example, a routing protocol may recompute routing information to no longer use this interface. An implementation may declare that the Ethernet interface is itself down; however, this behavior should be configurable. An Up(Layer-2, Y) callback should tell all modules that neighbor Y is again reachable (or that the Ethernet interface is up).

§ 4.2.6.1 Forwarding Liveness

Although forwarding liveness can be thought of as a protocol to be included in the protocol registration and status bit vectors, interface forwarding liveness status may be tracked and communicated independently of protocol status information. Such interface forwarding liveness status information may be used to communicate, to a neighbor, one's ability to forward packets from or to a given interface, and to learn about a neighbor's ability for the same. As was the case when this forwarding liveness status information is included with status information of protocols, an interface receiving a Down(P, Y) callback (where P is 'forwarding liveness') should inform all modules (such as routing protocols) interested in the forwarding capability status of neighbor Y that Y is no longer capable of forwarding packets received over the communication link attached to that interface. An interface receiving an Up(P, Y) callback should inform the modules interested in the forwarding capability status of neighbor Y that Y can forward packets received over the communication link attached to that interface.

§ 4.2.7 Configuration

Recall from FIG. 2 that configuration operations 205 may be used to set a hello interface 210, a {dead interval, neighbor node} pair 220 and protocols, interfaces, or both using the aggregated liveness determination operations 240. In one exemplary implementation of the invention, the number of Hellos sent every Dead Interval 220 is limited. This limit should override any of what follows. Also, the Hello Interval 210 time and Dead Interval 220 can be set subject to some minimum limits. For example, in some implementations, although Hello Intervals 210 and Dead Intervals 220 may defined in microseconds, it may be desirable to set minimum limits of about 100 milliseconds, at least until there is sufficient operational experience to indicate that smaller intervals (e.g., 10 milliseconds) are scalable for the particular application in which the invention is used. One useful consequence of APFL operations 240 is that the times of "normal" hellos (that is, hellos still used by the underlying protocols) can be made longer. The hello time should be no longer than the dead interval, and may be one-third, one-fourth or less of the dead time interval.

If the Hello Interval 210 or Dead Interval 220 change, APFL operations 240 may issue a Hello before hello timer T expires. If the protocols/interfaces using aggregated liveness 230 to be reported on are changed such that the new set of protocols, interfaces, or both to be reported on is a superset of the old, APFL operations 240 may issue a Hello before hello timer T expires. However, if there is any other change in the protocols/interfaces using aggregated liveness 230 to be reported on, APFL operations 240 should issue a Hello as soon as is reasonable. Moreover, multiple copies of this Hello should be issued to improve the chances of the neighbors receiving it correctly.

Configuration operations 205 should also permit authorized users to turn off reporting on any given protocol. Configuration operations 205 may also allow users to turn off running APFL operations over any given interface, or to any given neighbor node.

If APFL operations 240 can register to be notified by a protocol when the protocol's status changes, on receiving such a notification with a status transition from up to down, APFL operations 240 should rebuild the Hello with the latest values, and send it out as soon as is reasonable. If the status transition is down to up, APFL operations 240 may rebuild and send out a Hello before the timer T expires.

§ 4.2.8 Aggregating Protocol Liveness Determinations with Protocols Supporting and/or Running Graceful Restart Graceful Restart (See, e.g., Sangli, S., Y. Rekhter, R. Fernando, J. Scudder and E. Chen, "Graceful Restart Mechanism for BGP", work in progress; Berger, L., (Editor), "Generalized Multi-Protocol Label Switching (GMPLS) Signaling Resource ReserVation Protocol-Traffic Engineering (RSVP-TE) Extensions", RFC 3473; Shand, M., "Restart signaling for ISIS", work in progress. Leelanivas, M., Y. Rekhter, and R. Aggarwal, "Graceful Restart Mechanism for LDP", work in progress; Farrel, A. (Editor), "Fault Tolerance for the Label Distribution Protocol (LDP)", work in progress; and Moy, J., P. Pillay-Esnault, and A. Lindem, "Hitless OSPF Restart", work in progress, all incorporated herein by reference), also known as Hitless Restart, allows a protocol to restart while leaving the forwarding path undisturbed. If a node X and its neighbors can restart gracefully, it is not quite as urgent for X's neighbors to learn when X goes down. However, the principles of the invention can be used to assist the graceful restart process by, for example, pinpointing the time that the restarting protocol of node X goes down more accurately. This information can be used, for example, to begin restart procedures, and to permit more precise estimates of when to declare that (the protocol restarting on) node X is beyond recovery.

§ 4.2.9 Security Considerations

APFL messages should be authenticated, because spoofing or replaying APFL messages may deceive a router about the state of all its protocol peers. Encrypting the contents of APFL messages is not as important, although doing so may be useful in certain applications. In any event, since the invention mainly serves to provide more frequent liveness information (e.g., via more frequent hellos), a part of which is achieved by minimizing processing overhead, adding strong authentication systems may impose severe processing burdens.

§ 4.3 Illustrative Example

Figure 7:
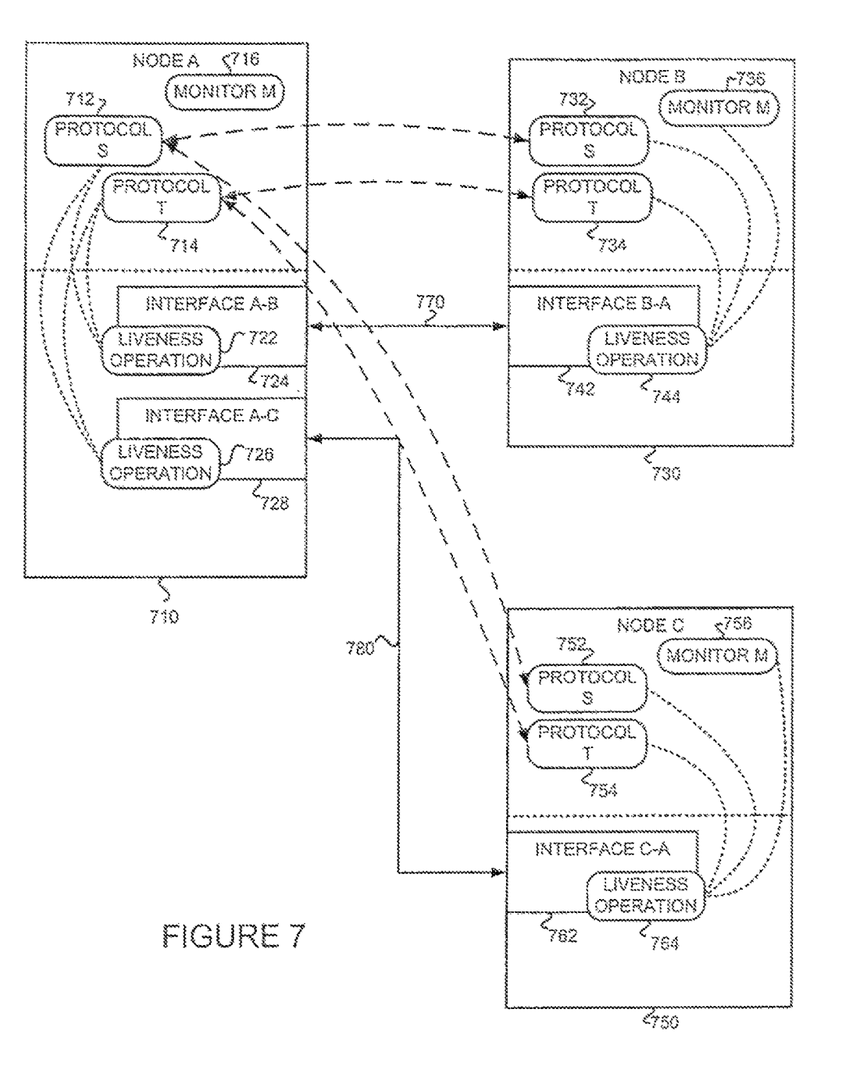
FIG. 7 is a block diagram illustrating operations in an exemplary implementation consistent with the principles of the invention.

FIG. 7 is a block diagram illustrating operations in an exemplary implementation consistent with the principles of the invention. As shown, various nodes may include (i) protocol facilities (above the horizontal dashed lines), included in what is commonly referred to as the "control plane," which, for example, may run routing protocols, and (ii) forwarding facilities (below the horizontal dashed lines), included in what is commonly referred to as the "data plane," which may forward data over one or more interfaces. In the exemplary implementation shown, instances of the liveness operations are provided on each interface and interact with information from one or more protocols, such as aggregate information. More specifically, as shown, Node A 710 shares link 770 with node B 730, and shares link 780 with node C 750. As indicated by the dashed arcs between the nodes, protocol S 712 running on node A 710 peers with protocol S 732 running on node B 730, as well as with protocol S 752 running on node C 750. Similarly, as also indicated by the dashed arcs between the nodes, protocol T 714 running on node A 710 peers with protocol T 734 running on node B 730, as well as with protocol T 754 running on node C 750. Furthermore, node A 710 may include a monitor M 716 which locally monitors forwarding capability of node A over interfaces A-B 724 and A-C 728. Nodes B 730 and C 750 may include similar modules 736 and 756, respectively. Finally, a liveness operation 722, consistent with the principles of the invention, is associated with interface A-B 724, and aggregates protocol liveness information for protocols S 712 and T 714 and monitor M 716. Liveness operation 722 may be include on the interface A-B 724 Similarly, a liveness operation 726 is associated with interface A-C 728, and aggregates protocol liveness information for protocols S 712 and T 714 and monitor M 716, a liveness operation 744 is associated with interface B-A 742, and aggregates protocol liveness information for protocols S 732 and T 734 and monitor M 736, and a liveness operation 764 is associated with interface C-A 762, and aggregates protocol liveness information for protocols S 752 and T 754 and monitor M 756. In another embodiment, a liveness operation may be associated with more than one interface (e.g., per interface card), but it may be preferable to distribute instances of a liveness operations.

In the following example, it is assumed that liveness operations 722 on node A 710 sends liveness information about protocols S 712 and T 714 to node B 730. Thus, node A 710 acts as a sender and node B 730 acts as a receiver. Of course, when node B 730 acts as a sender, node A 710 will act as the receiver. It is assumed that the liveness operation 722 can access the protocol status of the protocols and interfaces that it has been configured to report on, as well as report back to the protocols any received change of state.

§ 4.3.1 Sender Processing

Recall that the left branch of FIG. 3 illustrated an exemplary implementation of APFL sender processing. Suppose liveness operation 722 is configured to run with neighbor node B 730 with Dead Interval D (microseconds), Hello Time H (microseconds), and to report on protocols S, T, . . . . Note that H is local to a node—this value is not transmitted to APFL neighbors. Also, H should be at most D. Typically, however, H would be D/3 or D/4. Node B 730 is a directly attached neighbor to node A 710 as indicated by interface A-B 724. In this example, an exemplary implementation consistent with the principles of the invention may operate as follows.

(Step 0): Liveness operation 722 creates an appropriate IP header.

(Step 1): Liveness operation 722 creates a Common Header 410a with: R field 411 set to 0 if node B 730 is directly attached, else 1. Version field 412 is set to 1. Length field 414 is set to 28. Message Type field 413 is set to 1 (Hello). Interface Index field 416 is set to <index of interface A-B 724 or zero>. Common Header 410a will not change unless the interface index of interface A-B 724 changes.

(Step 2): Liveness operation 722 creates a protocol registry vector PRV that consists of the bits corresponding to the configured protocols S, T . . . set and the leaves the rest unset. Liveness operation 722 queries each configured protocol for its status with neighbor node B 730, and creates a protocol status vector PSV. Finally, liveness operation 722 creates a Hello message with Session field 412 set to 0, Dead Interval field 422 set to D, Sequence Number field 423 set to <monotonically increasing number>, protocol registry field 424 set to PRV, protocol status field 425 set to PSV, builds an APFL packet with common header 410a and Hello message 420a, and sends it to the ALL-APL-ROUTERS multicast address. (Recall, e.g., the left branch in FIG. 3A.)

(Step 3): Liveness operation 722 then sets a timer T to expire in H microseconds, and goes to sleep. (Recall, e.g., 308 of FIG. 3.) When timer T expires, liveness operation 722 goes back to Step 1. Every time liveness operation 722 sends a Hello, it restarts the timer T (with the latest value of H).

§ 4.3.2 Receiver Processing

Recall that the middle and right branches of FIG. 3 illustrated an exemplary implementation of APLF receiver processing. In the following, it is assumed that liveness operation 722 receives an APFL message from node B 730. Liveness operation 722 maintains a table of APFL neighbors keyed by <APFL Session, IP address, Interface Index>, and that contains:

| Field | Type | Initial Value |
| --- | --- | --- |
| Last_Received_Sequence_Number | 64-bit integer | 0 |
| Last_Received_Protocol_Registry | 32-bit vector | 0 |
| Last_Received_Protocol_Status | 32-bit vector | all "down" |
| Lost_Hellos_Timer | time | stopped |

(Recall, e.g., FIG. 5.)

When liveness operation 722 gets an APFL packet, it may decide, for example based on configuration or rate-limiting, to discard the packet. (Recall, e.g., 318 of FIG. 3.) Otherwise, liveness operation 722 does the following:

(Step 0): Sanity-check the packet. (Recall, e.g., 320 of FIG. 3).

(Step 1): Identify the APFL neighbor B by looking up the key <Session, Source IP Address, Interface Index> in a table. (Recall, e.g., 322 of FIG. 3) If no entry is found, liveness operation 722 may either discard the packet, or create a new entry for the key, with initial values as in the table above. (Recall, e.g., 326 of FIG. 3.)

(Step 2): Liveness operation 722 may then check that the received Sequence Number is larger than the Last_Received_Sequence_Number for this key (Recall, e.g., 328 of FIG. 3.). If not, it discards the packet. (Recall, e.g., 329.) Otherwise, it updates Last_Received_Sequence_Number, sets New_Registry to the received Protocol Registry, and sets New_Status to the received protocol status.

(Step 3): If New_Registry==Last_Received_Protocol_Registry, go to Step 4 below. Otherwise, for each protocol P that is in New_Registry and not in Last_Received_Protocol_Registry (added protocol):

```
set Last_Received_Protocol_Status[P] to down;
if (New_Status[P] == up)
call Up(P, B)
else
call Down(P, B)
```

(Recall, e.g., loop 370-380 of FIG. 3.) For each protocol P that is in Last_Received_Protocol_Registry and not in New_Registry (deleted protocol):

```
set Last_Received_Protocol_Status[P] to down;
call Up(P, B).
New_Status[P] is status of protocol P in New_Status. (Recall, e.g.,
loop 382-386 of Figure 3.)
(Step 4):      If the New_Status != Last_Received_Protocol_Status
then for each changed protocol P,
if (New_Status[P] == up)
call Up(P, B)
else
call Down(P, B). (Recall loop 350-358 of Figure 3.)
```

(Step 5): Set Last_Received_Sequence_Number= received Sequence Number; Last_Received_Protocol_Registry=New_Registry, (Recall 360 of FIG. 3.)

(Step 6): Reset the Lost_Hellos_Timer to fire after the received Dead Interval, (Recall 362 of FIG. 3.)

(Step 7): Done processing APFL Hello.

If the Lost_Hello_Timer fires, call Down(P, B) for each protocol P that is set in Last_Received_Protocol_Registry for node B 730 (Recall, e.g., loop 310-314 of FIG. 3), and stop the timer. (Recall, e.g., 316 of FIG. 3.)

Down(P, B) invokes protocol P's Down callback, and sets Last_Received_Protocol_Status[P] to down. Up(P, B) invokes protocol P's Up Callback. The number of times this callback is actually propagated to the protocol should be subject to some maximum limit. If Up(P, B) is sent to protocol P, then liveness operation 722 sets Last_Received_Protocol_Status[P] to up.

§ 4.4 Conclusions

As can be appreciated from the foregoing disclosure, the principles of the invention may comprise elements, apparatus, systems, data structures, computer-implemented code and methods for permitting the liveness of various protocols to be determined quickly, in a scalable manner (e.g., in terms of message size, total message frequency and processing overhead). By providing a small number of bits per protocol, which relay a simple set of information (such as up, down, not reporting, restarting, etc.), a compact, simple message may be used for conveying liveness-related information. Since the messages are small and can aggregate information from more than one protocol, they can be sent frequently. Normal operations of the protocols, such as normal hellos, are not affected, but may be relaxed (i.e., run less frequently). Moreover, the APFL messages and processing of such messages are not subject to the constraints of the protocols being monitored. Furthermore, interface forwarding liveness status information may be included with the protocol status information, or may be provided independent of protocol status information.

The foregoing description of embodiments consistent with the principles of the invention provides illustration and description, but is not intended to be exhaustive or to limit the invention to the precise form disclosed. Modifications and variations are possible in light of the above teachings or may be acquired from practice of the invention. For example, although a series of acts may have been described with reference to a flow diagram, the order of acts may differ in other implementations when the performance of one act is not dependent on the completion of another act. Further, non-dependent acts may be performed in parallel.

No element, act or instruction used in the description should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. For use with a data forwarding node of a data communications network, a method comprising:
    a) receiving, by the data forwarding node, status information indicating a state of each of at least two different kinds of routing protocols being run locally on the data forwarding node;
    b) composing, by the data forwarding node, an aggregated message including at least two indicators, each indicator identifying (1) a different one of the at least two different kinds of routing protocols being run on the data forwarding node and (2) the corresponding status information indicating a state of each of the at least two different kinds of routing protocols, as data within the aggregated message;
    c) sending, by the data forwarding node, the aggregated message towards a neighbor data forwarding node which runs at least one routing protocol that peers with at least one of the at least two different kinds of routing protocols being run on the data forwarding node;
    d) maintaining, by the data forwarding node, a first timer tracking a send time interval, wherein the acts of composing the aggregated message and sending the aggregated message are performed after each recurring expiration of the first timer; and
    e) restarting, by the data forwarding node, the first timer after the aggregated message is sent,
    wherein a single dead time interval associated with all of the at least two different kinds of routing protocols is provided to the neighbor data forwarding node, wherein the send time interval is less than the single dead time interval, and wherein the single dead time interval defines a time interval after which, if no further aggregated message is received by the neighbor data forwarding node from the data forwarding node after the neighbor forwarding node has received the sent aggregated message, all of the at least two different kinds of routing protocols are declared as down.

2. The method of claim 1, wherein the send time interval is less than one second.

3. The method of claim 1, wherein the send time interval is less than 100 msec.

4. The method of claim 1, wherein the act of sending the aggregated message includes providing the aggregated message in an Internet protocol packet.

5. The method of claim 4, wherein the act of sending the aggregated message towards the neighbor data forwarding node includes setting a destination address in the Internet protocol packet to a multicast address associated with routers that support aggregated protocol liveness.

6. The method of claim 1, wherein the status information of at least one of the at least two different kinds of routing protocols included in the aggregated message includes a routing protocol state set to at least one of (A) routing protocol not reporting, and (B) routing protocol restarting.

7. The method of claim 1, wherein a first one of the at least two indicators identifies a first kind of routing protocol from a group of routing protocols consisting of (A) Border Gateway Protocol (BGP), (B) Intermediate system to intermediate system (IS-IS), (C) Open Shortest Path First-Version 2 (OSPF v2), (D) Open Shortest Path First-Version 3 (OSPF v3), (E) Routing Information Protocol Version 1/Version 2 (RIP v1/v2), (F) Routing Information Protocol next generation (RIP-ng), (G) Protocol-Independent Multicast (PIM), (H) Distance Vector Multicast Routing Protocol (DVMRP), (I) Label Distribution Protocol (LDP), (J) Resource Reservation Protocol (RSVP) and (K) Link Management Protocol (LMP), and
    wherein a second one of the at least two indicators identifies a second kind of routing protocol, which is different from the first kind of routing protocol identified, from a group of routing protocols consisting of (A) Border Gateway Protocol (BGP), (B) Intermediate system to intermediate system (IS-IS), (C) Open Shortest Path First-Version 2 (OSPF v2), (D) Open Shortest Path First-Version 3 (OSPF v3), (E) Routing Information Protocol Version 1/Version 2 (RIP v1/v2), (F) Routing Information Protocol next generation (RIP-ng), (G) Protocol-Independent Multicast (PIM), (H) Distance Vector Multicast Routing Protocol (DVMRP), (I) Label Distribution Protocol (LDP), (J) Resource Reservation Protocol (RSVP) and (K) Link Management Protocol (LMP).

8. The method of claim 1, wherein the aggregated message includes (i) a protocol registry field including a value identifying the kind of each of the at least two different kinds of routing protocols and (ii) a protocol status field indicating the state of each of the at least two protocols.

9. For use with a data forwarding node of a data communications network, a method comprising:
   a) receiving, by the data forwarding node,
      i) an aggregated message including, for a first set of at least two different kinds of routing protocols being run locally on a neighbor data forwarding node, at least two indicators, each indicator (1) identifying a different one of the at least two different kinds of routing protocols and (2) corresponding status information for each of the protocols of the first set of the at least two different kinds of routing protocols, as data within the aggregated message, wherein the data forwarding node runs at least one routing protocol that peers with at least one of the at least two different kinds of routing protocols being run locally on the neighbor data forwarding node, and
      ii) a single dead time interval associated with all of the different kinds of routing protocols; and
   b) updating, by the data forwarding node, neighbor routing protocol status information of the at least two different kinds of routing protocols being run locally on the neighbor data forwarding node using the aggregated message, wherein the act of updating neighbor routing protocol status information includes
      i) setting, by the data forwarding node, a first timer to the single dead time interval and starting the first timer,
      ii) determining, by the data forwarding node, whether the first timer expires,
      iii) if the first timer expires, setting, by the data forwarding node, the status of each of the neighbor routing protocols being run on the neighbor data forwarding node to down, and
      iv) if a further aggregated message, sourced from the neighbor data forwarding node, and including for a second set of at least two routing protocols, at least two indicators, each indicator identifying the at least two routing protocols and corresponding status information for each of the routing protocols of the second set, is received before the first timer expires, then resetting, by the data forwarding node, the first timer to a new single dead time interval and restarting the first timer.

10. The method of claim 9, wherein each of the single dead time interval and the new single dead time interval is less than one second.

11. The method of claim 9, wherein the status information of at least one of the at least two different kinds of routing protocols included in the first set of at least two different kinds of routing protocols included within the aggregated message includes a routing protocol state set to one of (A) routing protocol not reporting, and (B) routing protocol restarting.

12. The method of claim 9, wherein a first one of the at least two indicators identifies a first kind of routing protocol from a group of routing protocols consisting of (A) Border Gateway Protocol (BGP), (B) Intermediate system to intermediate system (IS-IS), (C) Open Shortest Path First-Version 2 (OSPF v2), (D) Open Shortest Path First-Version 3 (OSPF v3), (E) Routing Information Protocol Version 1/Version 2 (RIP v1/v2), (F) Routing Information Protocol next generation (RIP-ng), (G) Protocol-Independent Multicast (PIM), (H) Distance Vector Multicast Routing Protocol (DVMRP), (I) Label Distribution Protocol (LDP), (J) Resource Reservation Protocol (RSVP) and (K) Link Management Protocol (LMP), and
   wherein a second one of the at least two indicators identifies a second kind of routing protocol, which is different from the first kind of routing protocol identified, from a group of routing protocols consisting of (A) Border Gateway Protocol (BGP), (B) Intermediate system to intermediate system (IS-IS), (C) Open Shortest Path First-Version 2 (OSPF v2), (D) Open Shortest Path First-Version 3 (OSPF v3), (E) Routing Information Protocol Version 1/Version 2 (RIP v1/v2), (F) Routing Information Protocol next generation (RIP-ng), (G) Protocol-Independent Multicast (PIM), (H) Distance Vector Multicast Routing Protocol (DVMRP), (I) Label Distribution Protocol (LDP), (J) Resource Reservation Protocol (RSVP) and (K) Link Management Protocol (LMP).

13. The method of claim 9, wherein the aggregated message includes (i) a protocol registry field including a value identifying the kind of each of the at least two different kinds of routing protocols and (ii) a protocol status field indicating the state of each of the at least two protocols.

14. A data forwarding node of a data communications network, the data forwarding node comprising:
   a) at least one processor; and
   b) at least one storage device storing
   processor-executable instructions which, when executed by the at least one processor, perform a method including
      1) receiving status information indicating a state of each of at least two different kinds of routing protocols being run locally on the data forwarding node,
      2) composing an aggregated message including at least two indicators, each indicator identifying (1) a different one of the at least two different kinds of routing protocols being run on the data forwarding node and (2) the corresponding status information indicating a state of each of the at least two different kinds of routing protocols, as data within the aggregated message,
      3) sending the aggregated message towards a neighbor data forwarding node which runs at least one routing protocol that peers with at least one of the at least two different kinds of routing protocols being run on the data forwarding,
      4) maintaining a first timer tracking a send time interval, wherein the acts of composing the aggregated message and sending the aggregated message are performed after each recurring expiration of the first timer, and
      5) restarting the first timer after the aggregated message is sent,
   wherein a single dead time interval associated with all of the at least two different kinds of routing protocols is provided to the neighbor data forwarding node, wherein the send time interval is less than the single dead time interval, and wherein the single dead time interval defines a time interval after which, if no further aggregated message is received by the neighbor data forwarding node from the data forwarding node after the neighbor forwarding node has received the sent aggregated message, all of the at least two different kinds of routing protocols are declared as down.

15. The node of claim 14, wherein the send time interval is less than one second.

16. The node of claim 14, wherein the send time interval is less than 100 msec.

17. The node of claim 14, wherein the act of sending the aggregated message includes providing the aggregated message in an Internet protocol packet.

18. The node of claim 17, wherein the act of sending the aggregated message towards the neighbor node includes setting a destination address in the Internet protocol packet to a multicast address associated with routers that support aggregated protocol liveness.

19. The node of claim 14, wherein the status information of at least one of the at least two different kinds of routing protocols included in the aggregated message includes a routing protocol state set to at least one of (A) routing protocol not reporting, and (B) routing protocol restarting.

20. The node of claim 14, wherein a first one of the at least two indicators identifies a first kind of routing protocol from a group of routing protocols consisting of (A) Border Gateway Protocol (BGP), (B) Intermediate system to intermediate system (IS-IS), (C) Open Shortest Path First-Version 2 (OSPF v2), (D) Open Shortest Path First-Version 3 (OSPF v3), (E) Routing Information Protocol Version 1/Version 2 (RIP v1/v2), (F) Routing Information Protocol next generation (RIP-ng), (G) Protocol-Independent Multicast (PIM), (H) Distance Vector Multicast Routing Protocol (DVMRP), (I) Label Distribution Protocol (LDP), (J) Resource Reservation Protocol (RSVP) and (K) Link Management Protocol (LMP), and wherein a second one of the at least two indicators identifies a second kind of routing protocol, which is different from the first kind of routing protocol identified, from a group of routing protocols consisting of (A) Border Gateway Protocol (BGP), (B) Intermediate system to intermediate system (IS-IS), (C) Open Shortest Path First-Version 2 (OSPF v2), (D) Open Shortest Path First-Version 3 (OSPF v3), (E) Routing Information Protocol Version 1/Version 2 (RIP v1/v2), (F) Routing Information Protocol next generation (RIP-ng), (G) Protocol-Independent Multicast (PIM), (H) Distance Vector Multicast Routing Protocol (DVMRP), (I) Label Distribution Protocol (LDP), (J) Resource Reservation Protocol (RSVP) and (K) Link Management Protocol (LMP).

21. A data forwarding node of a data communications network, the data forwarding node comprising:
a) at least one processor; and
b) at least one storage device storing processor-executable instructions which, when executed by the at least one processor, perform a method including
1) receiving
   i) an aggregated message including for a first set of at least two different kinds of routing protocols being run locally on a neighbor data forwarding node, at least two indicators, each indicator (1) identifying a different one of the at least two different kinds of routing protocols and (2) corresponding status information for each of the protocols of the first set of the at least two different kinds of routing protocols, as data within the aggregated message, wherein the data forwarding node runs at least one routing protocol that peers with at least one of the at least two different kinds of routing protocols being run locally on the neighbor data forwarding node, and
   ii) a single dead time interval associated with all
2) updating neighbor routing protocol status information of the at least two different kinds of routing protocols being run locally on the neighbor data forwarding node using the aggregated message, wherein the act of updating neighbor routing protocol status information includes
   i) setting a first timer to the single dead time interval and starting the first timer,
   ii) determining whether the first timer expires,
   iii) if the first timer expires, setting the status of each of the neighbor routing protocols being run on the neighbor data forwarding node to down, and
   iv) if a further aggregated message, sourced from the neighbor data forwarding node, and including, for a second set of at least two routing protocols, at least two indicators, each indicator identifying the at least two routing protocols and corresponding status information for each of the routing protocols of the second set, is received before the first timer expires, then resetting the first timer to a new single dead time interval and restarting the first timer.

22. The node of claim 21, wherein each of the single dead time interval and the new single dead time interval is less than one second.

23. The node of claim 21, wherein the status information of at least one of the at least two different kinds of routing protocols included in the first set of at least two different kinds of routing protocols included within the aggregated message includes a routing protocol state set to one of (A) routing protocol not reporting, and (B) routing protocol restarting.

24. The node of claim 21, wherein a first one of the at least two indicators identifies a first kind of routing protocol from a group of routing protocols consisting of (A) Border Gateway Protocol (BGP), (B) Intermediate system to intermediate system (IS-IS), (C) Open Shortest Path First-Version 2 (OSPF v2), (D) Open Shortest Path First-Version 3 (OSPF v3), (E) Routing Information Protocol Version 1/Version 2 (RIP v1/v2), (F) Routing Information Protocol next generation (RIP-ng), (G) Protocol-Independent Multicast (PIM), (H) Distance Vector Multicast Routing Protocol (DVMRP), (I) Label Distribution Protocol (LDP), (J) Resource Reservation Protocol (RSVP) and (K) Link Management Protocol (LMP), and wherein a second one of the at least two indicators identifies a second kind of routing protocol, which is different from the first kind of routing protocol identified, from a group of routing protocols consisting of (A) Border Gateway Protocol (BGP), (B) Intermediate system to intermediate system (IS-IS), (C) Open Shortest Path First-Version 2 (OSPF v2), (D) Open Shortest Path First-Version 3 (OSPF v3), (E) Routing Information Protocol Version 1/Version 2 (RIP v1/v2), (F) Routing Information Protocol next generation (RIP-ng), (G) Protocol-Independent Multicast (PIM), (H) Distance Vector Multicast Routing Protocol (DVMRP), (I) Label Distribution Protocol (LDP), (J) Resource Reservation Protocol (RSVP) and (K) Link Management Protocol (LMP).

* * * * *